United States Patent [19]

Jorgensen

[11] Patent Number: 5,431,814
[45] Date of Patent: Jul. 11, 1995

[54] CENTRIFUGAL FILTER APPARATUS AND METHOD

[76] Inventor: Glen Jorgensen, 38 Beverly Dr., Marlboro, Mass. 01752

[21] Appl. No.: 142,497

[22] Filed: Oct. 22, 1993

[51] Int. Cl.6 .............................................. B01D 35/00
[52] U.S. Cl. .................................. 210/399; 210/360.2; 210/380.1; 210/416.1; 210/398
[58] Field of Search ................... 210/360.1, 360.2, 364, 210/365, 380.1, 416.1, 512.1, 398, 516, 787, 399; 494/36, 42, 43, 47; 422/101

[56] References Cited

U.S. PATENT DOCUMENTS

| | | | |
|---|---|---|---|
| 4,832,853 | 5/1989 | Shiraki et al. | 210/365 |
| 5,281,343 | 1/1994 | Lewis et al. | 210/784 |
| 5,282,981 | 2/1994 | Adams et al. | 210/516 |
| 5,314,074 | 5/1994 | Inbar et al. | 210/516 |

*Primary Examiner*—Robert A. Dawson
*Assistant Examiner*—David Reifsnyder
*Attorney, Agent, or Firm*—M. Lawrence Oliverio

[57] ABSTRACT

A rotary filtration apparatus for separating a selected material suspended in a fluid, the apparatus comprising a housing having a selected axis of rotation, the housing being rotatably mounted on a rotation device which rotates the housing about the selected axis of rotation of the housing; the housing sealably enclosing and defining a fluid sealed cavity extending radially outwardly from the axis of the housing; a filter mounted within the cavity of the housing such that the cavity is divided into at least a first fluid retentive input chamber and a second fluid retentive output chamber, the input and output chambers being disposed on opposite sides of the filter; a fluid input line sealably communicating with the fluid input chamber for feeding the material suspended in the fluid into the input chamber under a selected pressure; the filter being selectively permeable to the fluid under the selected pressure and selectively impermeable to the selected material under the selected pressure, the fluid being fed into the input chamber flowing through the filter and into the output chamber under the selected pressure; a fluid output line sealably communicating with the input chamber for receiving and routing fluid which is fed into the input chamber out of the input chamber; the rotation device drivably rotating the housing around the axis such that the material suspended in the fluid in the input chamber is forced to travel under centripetal force in a radially outward direction from the axis.

28 Claims, 8 Drawing Sheets

CENTRIFUGAL FILTER APPARATUS AND METHOD

BACKGROUND OF THE INVENTION

The present invention relates to the separation or concentration of solid materials suspended in a fluid medium and, more particularly, to novel methods and apparati for filtering suspended solid materials at high volume and efficiency without blinding or plugging the filter material.

Conventional filtration techniques for filtering solid particles such as cells, macromolecules (e.g., proteins), or other microsized solid materials which may be suspended in a fluid media utilize a sheet-like membrane or tubule having pores which are impermeable to the particle material. Such techniques strive to maximize the surface area of the selected filter material in order to maximize the volume of fluid which can be filtered before the pores of the surface of the membrane filter become completely filled with particles and thus blinded by the solid material. Prior efforts to obviate membrane blinding have attempted to maintain the solids containing fluid in some sort of tangential flow pattern during the filtration process. The various hardware and methodology employed however are inefficient, cumbersome, expensive to manufacture and eventually result in blinding of the surface of the filter membrane over time in any event.

Other techniques employ a generally cylindrical-shaped filter which rotates at high speeds within a sealed housing. These devices rely on high shear forces to increase the tangential flow patterns that are normally required to prevent membrane fouling. The degree of concentration of the solid material is limited since the high shear rate also tends to mechanically damage the suspended particles. In the case of mammalian or plant cells, the shear forces tend to lyce the cell wall, thereby destroying the cell and releasing cellular components into the surrounding media. Further, these rotational devices are required to use rotating seals to seal the fluid pathways as they transition from a non-rotating to a rotating pathway. The frictional losses in this rotating seal also contribute to particle damage via excessive heat and shear forces.

SUMMARY OF THE INVENTION

It is therefore an object of the invention to provide a method and apparatus for filtering fluids containing suspended solids in high concentration and at a high throughput using a filter without premature blinding of the filter surface and without inducing mechanical damage to this solid material. Examples of specific applications of the invention are in the separation of a biomass of selected cells cultured in a liquid growth medium, separation of blood cells from blood plasma, separation of selected biomolecules from a liquid medium, separation of waste materials suspended in a liquid such as in sludge removal, recycling, waste water treatment and the like. In addition to separation per se, the invention contemplates simply concentrating solid materials suspended in fluid even though other materials may remain suspended or dissolved in the fluid in which the suspended solid material is concentrated.

In accordance with the invention a filter material is selected which is totally impermeable or partially impermeable to the solid material to be separated from or concentrated in the fluid. The filter is mounted within a fluid sealed housing so as to form a pair of fluid containment chambers on opposing surfaces of the filter. A supply of fluid containing the suspended solid material is input into one chamber under a pressure sufficient to allow at least the fluid to penetrate through the filter into the other chamber thus concentrating the solid material in the fluid which is fed into the input chamber. The solids containing fluid is continuously fed into and removed from the input chamber such that the solids containing fluid is constantly flowing through the chamber.

The fluid is continuously input by pumping or other conventional means and simultaneously removed by pumping or other conventional means such that the pressure of the fluid flowing through the input chamber is controllably maintained at a preselected pressure and a constant flow of fluid maintained through the chamber.

The housing in which the filter is mounted is preferably configured as a rotor or a rotating cassette which is mounted on a mechanism which rotatably drives the housing around a preselected axis of the housing. As the housing is rotated, centripetal force acts on the suspended solid material to force the suspended solid material to travel radially outwardly from the rotation axis toward the most radially outward position within the input chamber. The filter can be mounted within the housing such that the surface of the filter is disposed at essentially any angle relative to the rotation axis of the housing.

The fluid inlet port to the input chamber is preferably arranged such that the flow of solids containing fluid is directed across or along the surface of the filter thus creating a fluid flow along the filter surface which tends to dislodge or agitate solid material which comes in contact with the filter surface and thus tends to prevent the filter surface from becoming blinded or clogged. Most preferably, the outlet port for removing the solids containing fluid from the input chamber is disposed at a radially outward position within the input chamber such that the fluid in the immediate vicinity of the outlet port contains the solid material which has been concentrated by the centripetal force toward the radially outward areas or volume of the input chamber.

The fluid outlet port of the input chamber may alternatively be disposed at a position along the radial length of the input chamber where the solid material does not tend to be concentrated by the centripetal force thus allowing the solid material to aggregate within the input chamber rather than removed from the input chamber through the exit or outlet port.

Preferably the apparatus is configured such that the rotor or cassette is mounted with its rotation axis being horizontal or substantially horizontal relative to the ground. Such arrangement allows the rotary filter to be easily mounted and dismounted by the user.

As can be readily imagined, the chamber into which the fluid permeates through the filter has an outlet port through which the filtered fluid or permeate is continuously removed. Depending on the particular solid material, feed pressure, fluid and the particular pore size of the membrane of the filter selected for the application, the solid material of known size is rejected by the membrane. In some applications, the solid material that is rejected by the membrane, the retentate, may be retained and the permeate discarded (e.g., in cell culture applications) and in other applications the retentate may be discarded and permeate retained (e.g. waste water treatment or sludge removal).

In other applications, two or more selected particles may be chosen for separation and concentration. In these cases, multiple fluid chambers are included in the rotor, each separated by a membrane with successively smaller pore sizes. The solid material that is allowed to permeate through the first filter is rejected by a subsequently finer filter. The principles of flow dynamics within each chamber is the same as that previously described for the embodiment of the invention that contains only two chambers separated by one membrane. This includes the cleaning effect of the centripetal force as it moves the solids away from each membrane and toward a collecting area in each chamber that is located radially outward from the membrane.

In another embodiment, a rotor may include multiple separate pairs of concentric inlet/outlet chambers for increasing the efficiency of the rotor. For ease of explanation below, embodiments depicting only a single pair of inlet/outlet chambers are described.

BRIEF DESCRIPTION OF THE DRAWINGS

The invention is described in detail below with reference to examples of embodiments shown in the drawings wherein.

DETAILED DESCRIPTION OF PREFERRED EMBODIMENTS

Figure 1:
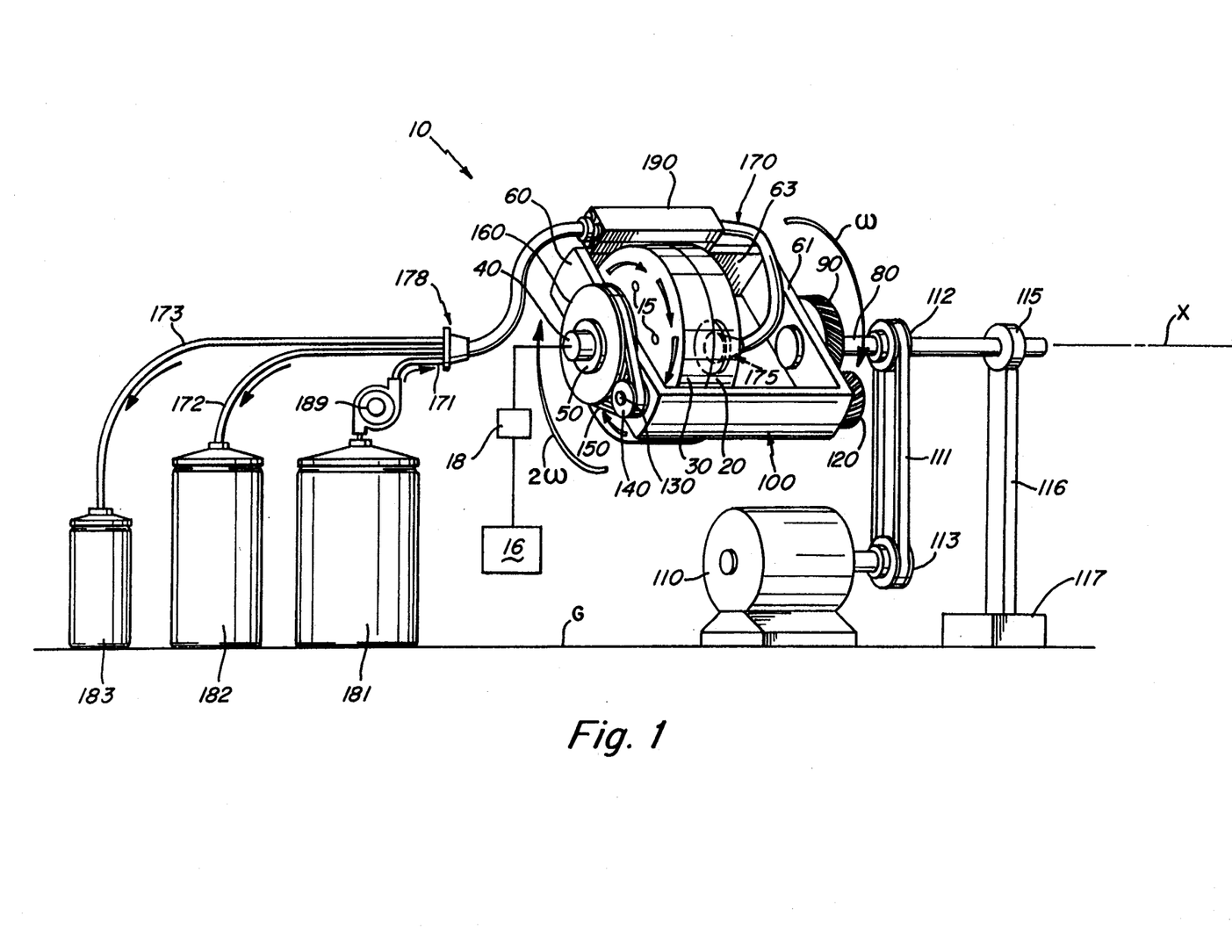
FIG. 1 is a schematic perspective view of an apparatus according to the invention showing a filtration rotor or cassette mounted for rotation about a horizontal axis with the rotor being connected to a common fluid feed and fluid outlet tubing assembly mounted for rotation around the rotor.

There is shown in FIG. 1 in schematic form a rotary filtration apparatus 10 according to the invention. The apparatus 10 comprises a filtration rotor or cassette 20 which is mounted on a rotatably driven mounting wheel or chuck 30 for rotation around an axis X. As shown, the rotation axis X of the filtration rotor 20 and the mechanism 30 on which the rotor 20 is mounted is disposed horizontally relative to the ground G.

The rotor 20 is mountable on the chuck 30 by any conventional means such as with bolts, via air suction, snap fit pin and aperture mechanisms, clamping mechanisms and the like. Preferably the rotor 20 is readily mountable on and dismountable from the drive mechanism for ease of use. As shown schematically in FIG. 1, the chuck 30 is provided with air suction apertures 15 which are connected to an air suction vacuum source 16 which can be switched on by the user to suctionally hold the rotor 20 on the chuck or switched off to release the rotor 20 from the chuck 30. The air suction apertures are a schematic representation of drilled passageways through the shafts and housing to connect the vacuum source 16 to the vacuum apertures 15 in the rotating chuck 30 via conventional means such as a rotating seal 18.

The mounting chuck 30 has an axle 40 mounted within a rotary bearing 50 which is mounted on the arm 60 of a frame 100 which rotatably orbits around the circumference of the rotor 20 as described below.

Arm 61 of frame 100 is rigidly connected to a primary drive shaft 80 which is rotatably driven by connection to motor 110 through belt 111 and pulleys 112, 113 as shown. The primary drive shaft 80 is supported by any conventional means such that the axis X is stationarily held in a horizontal disposition, e.g. by conventional mounting of shaft 80 in a bearing 115 which is in turn connected to a support 116 and a fixed base 117 shown schematically in FIG. 1.

Motor 110 drives the entire assembly. The horizontally disposed shaft 80 is rigidly connected to radial arm 61 of orbit frame 100. The axle 80 and frame 100 are rotatably driven at a selected rotational speed $\omega$ by the motor 110 through the belt 111 and pulleys 112, 113 shown in FIG. 1.

A master gear 90 is coaxially mounted around axle 80 and remains stationary relative to the radial arm 61 as axle 80 and arm 61 rotate. Gear 90 meshes with a transfer drive gear 120. Transfer drive gear 120 is rotatably mounted on the distal end of arm 61 of frame 100 via connection to a transfer drive shaft 130 which extends through and is rotatably mounted in a pair of complementary apertures provided in the distal ends of arms 60, 61. The transfer drive shaft 130 is rigidly connected to the axis of gear 120 and a transfer drive pulley 140 thus causing pulley 140 and gear 120 to rotate simultaneously at the same rotational speed when the assembly is driven.

Transfer pulley 140, in turn, drives pulley 160 through belt 150. Pulley 160 is rigidly connected to mounting wheel or chuck 30 via axle 40 thus causing chuck 30 and the rotary filter to be rotated at the same rotational speed as pulley 160.

As frame 100 rotates at speed ω gear 120 is orbitally rotated at speed ω around master gear 90. As gear 120 is orbitally rotated, gear 120 is also axially rotated by its meshing with non-rotating gear 90. The gear ratio between gears 90, 120 and the pulley ratios between pulleys 140, 160 are precisely selected such that the rotational speed of chuck 30 and rotary filter 20 is precisely two times, 2 ω, the orbiting speed of frame 100.

Figure 6A:
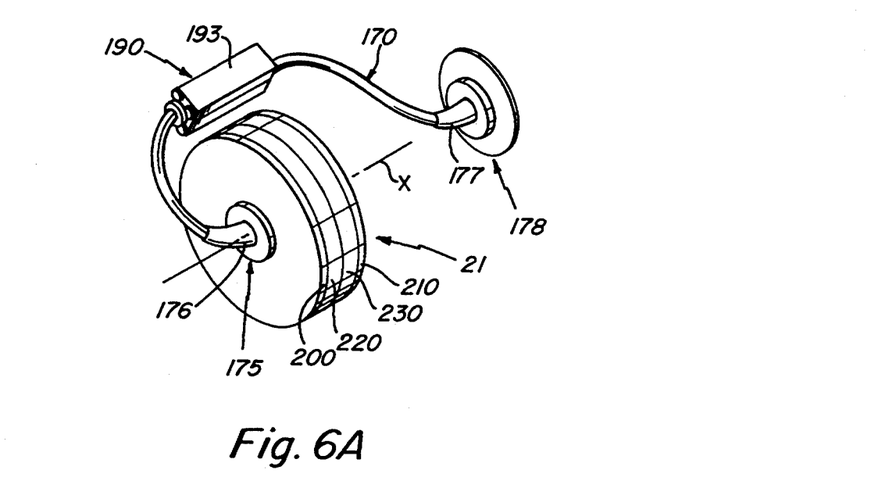
FIG. 6A is a mirror image perspective view of the fluid feed and removal tube assembly component of the FIG. 1 apparatus showing preferred points of attachment and mounting of the feed tube assembly with respect to the rotor component of the apparatus.
Figure 7A:
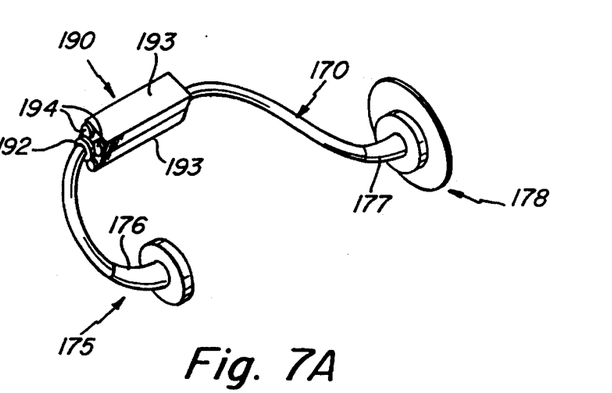
FIG. 7A is a mirror image perspective view of the fluid feed and removal tube assembly component of the FIG. 1 apparatus.
Figure 7B:
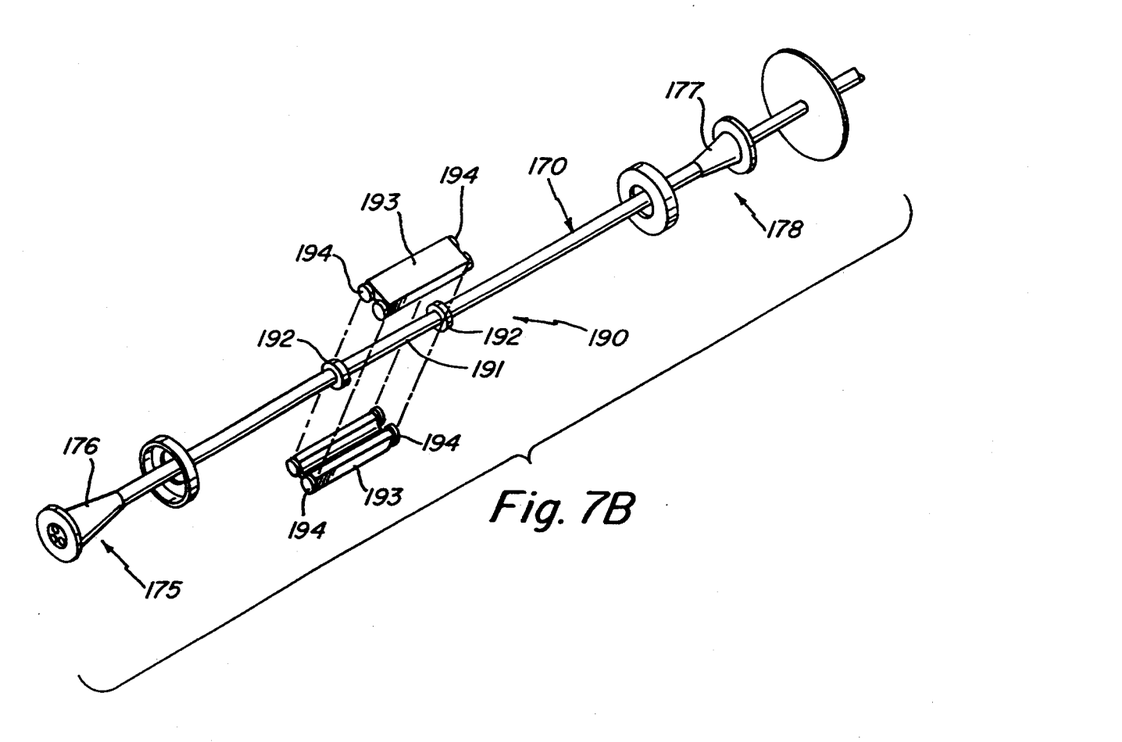
FIG. 7B is an exploded view of FIG. 7A.

As shown in FIG. 1 and in the mirror image FIGS. 6A, 7A, 7B, a bundle of tubes 170 is rigidly and non-rotatably attached at one terminal end to the axis of rotary filter assembly 20. As shown, the bundle 170 of tubes comprises at least three tubes 171, 172, 173 each respectively connected at another terminal end to a feed supply of fluid containing suspended solids 181, a receptacle for receiving concentrated or separated solid materials 182 and a receptacle for receiving filtered fluid 183.

As can be readily imagined, if the end 175, FIGS. 6A, 7A, 7B, of the tubing bundle 170 is fixedly attached to the axis of rotor 20, the tubing bundle 170 will be rotated around its axis simultaneously with rotation of the rotor 20 and thus twist as rotor 20 rotates. In order to avoid the use of costly rotating seals which would otherwise be necessary to accommodate the axial rotation of the tubing 170, the orbiting frame 100 is provided for rotating the tubing 170 when bent around the rotating rotor 20 as shown in FIG. 1 at one half the rotational speed ω at which as the rotor 20 is rotated. As shown in FIG. 1 the tubing is bent around the circumference of the rotor 20 and a section of the bent around tubing 170 is held in a holder 190 which is attached to a transverse arm 63 of the frame 100 which orbits the circumference of the rotor 20. When the frame 100 rotates, the bent tubing 170 flexes about its own axis in the direction of the 2 ω rotor 20 at a speed of −1 ω relative to the holder 190. This motion unwinds the twist that is put into the tubing by the frame 100 which is orbiting at +1 ω such that the twists net out to no twist in the tubing 170 at its fixed ends.

With reference to FIGS. 6A and 7A which show the rotor 20 and tubing bundle 170 in mirror image relative to the view in FIG. 1, one terminal end 175 of the bundle 170 is rigidly attached to the rotor 20, most preferably such that the axis of the bundle 170 is coaxial (with the rotation axis X of the rotor 20. The end 175 is also preferably snugly fit within a protective sleeve 176 which tends to relieve the terminal tubing end 175 of severe local stresses which might occur in the end 175 of the tubing bundle 170 as a result of the simultaneous orbiting of holder 190 and rotation of rotor 20. The other terminal end 178 of the tubing 170 is also snugly fit within a protective sleeve for the same purpose. As shown in FIGS. 6A, 7A, 7B the sleeves 176 are configured as a cone for better shock and stress absorbance.

As shown in FIGS. 1, 6A the tubing 170 is flexible and is bent around the outside circumference of the rotor 20 with a midsection portion being held in holder 190 which orbits around the circumference of the rotor 20. The mid-portion of the tubing 170 is snugly held within a tube 191 having flanges 192 on the ends thereof, FIG. 7B. A pair of holder clamps 193 having freely rotatable wheels 194 mounted thereon attach together around the tube holder 191 and seat between the flanges 192 such that the circumference of the freely rotatable wheels 194 engage the outer surface of the holder tube 191. The holder tube 191 is thus freely rotatable within the clamped together components 193 by virtue of rollable engagement between the circumference of the wheels 194 and the outer surface of tube holder 191. The section of the tubing 170 which is snugly held within tube holder 191 is thus also freely rotatable within clamps 193 such that when the clamp sections 193 orbit around the circumference of rotor 20, the tubing section held between the clamp sections 193 is not forced to twist as a result of the orbiting of holder 190 but rather freely rotate therein. The tubing holder 191 serves to relieve the tubing section held therein from direct frictional engagement with the circumference of rollers 194 thereby extending the life of the tubing 170. Rollers 194 are mounted in clamp sections 193 in any conventional manner for free rotation around their axes, e.g., via ball bearings.

Preferably, the axis of rotation of frame 100 and rotor 20 are coincident for ease of construction of apparatus 10, however the rotation axis of rotor 20 may have a different arrangement such that its axis is not coincident with the axis of frame 100 as long as holder 190 is capable of orbiting the circumference of the rotor 20.

Figure 2:
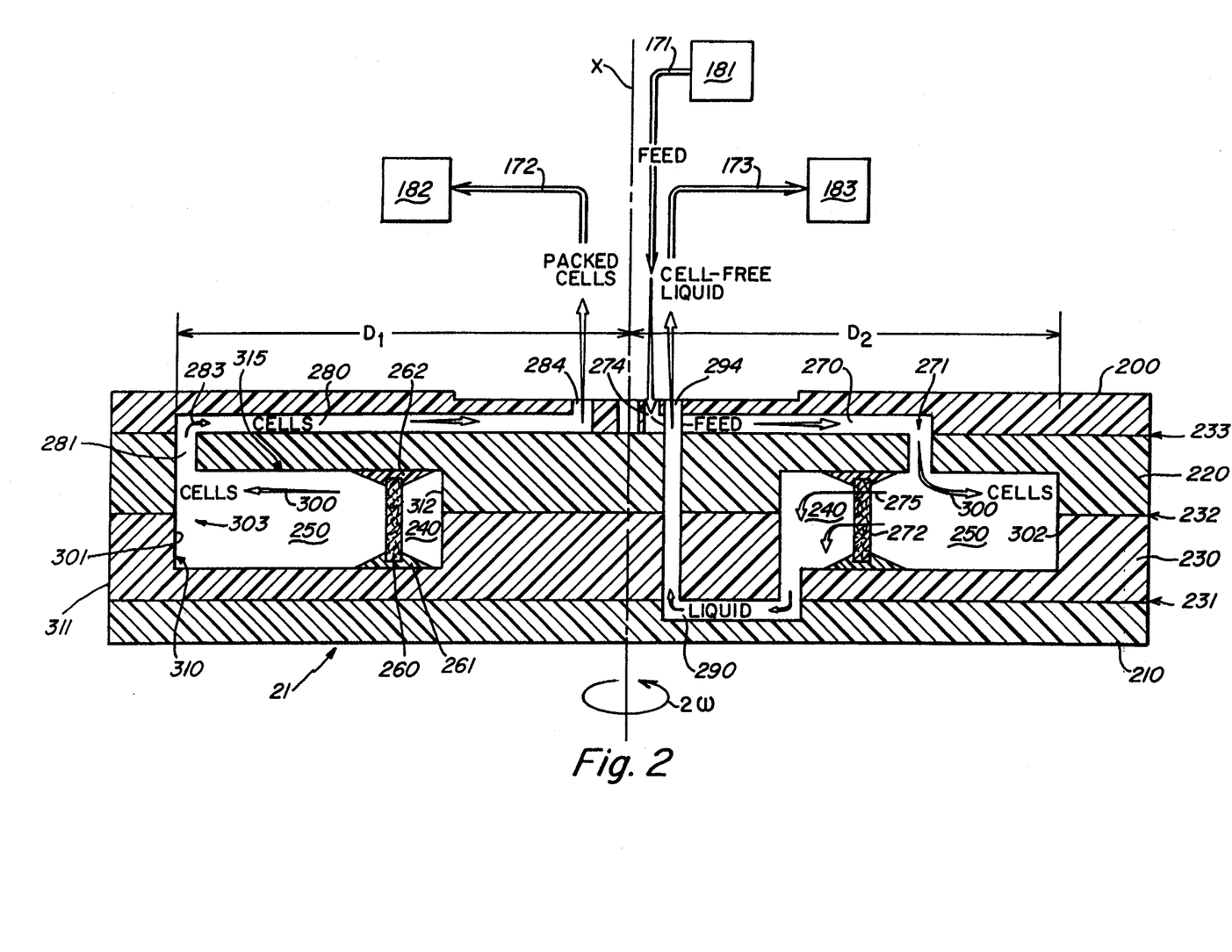
FIG. 2 is a schematic cross-sectional view along the diameter of one embodiment of a filtration rotor according to the invention having a filter mounted parallel to the rotation axis of the rotor.
Figure 3:
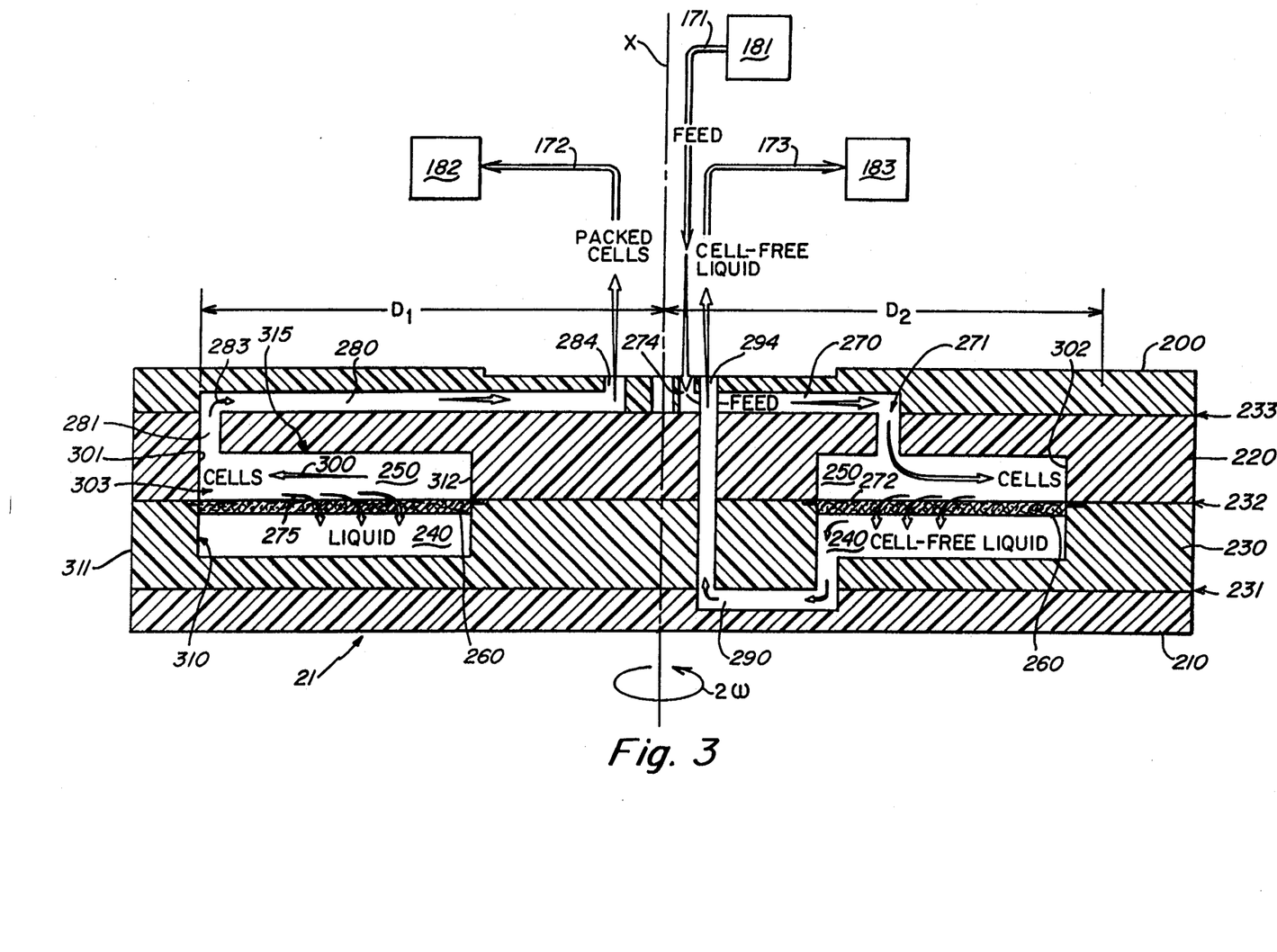
FIG. 3 is a schematic cross-sectional view along the diameter of another embodiment of a filtration rotor according to the invention having a filter mounted at a right angle to the rotation axis of the rotor.

The ends of the individual fluid conveying tubes 171, 172, 173, FIG. 1, are sealably and fixedly attached at end 175 of the bundle 170, FIGS. 6A, 7A, 7B to complementary fluid channel ports disposed around the axis of the rotor 20, such as ports 274, 284, 294 as shown in FIGS. 2, 3 and described in detail below.

One exemplary detailed embodiment of a filtration rotor assembly 21 is shown in FIG. 2. In the FIG. 2 embodiment, the rotor assembly 21 is shown in a side cross-section along a diameter of the rotor assembly 21. The rotor assembly 21 comprises a top plate 200, bottom plate 210, upper middle housing section 220 and bottom middle housing section 230 all of which are attached to each other by conventional means such as gluing, bolting or the like so as to form a unified assembly 21 as shown in FIG. 2. The various components 200, 210, 220, 230 are assembled such that a fluid sealed cavity 240, 250 is formed within the body of the assembly 21. Conventional mechanisms such as rubber gaskets, O-rings or the like may be disposed between the mating surfaces 231, 232, 233 of the various components so as to better ensure that the chambers 240, 250 remain sealed against fluid leakage out of the assembly 21. Preferably, the components 200-230 are comprised of a plastic or other material which form a fluid seal at the mating surfaces 231, 232, 233 when the components are compressed against each other.

As shown in FIG. 2, a filter 260 is mounted within the fluid sealed cavity of the assembly 21 such that the cavity is divided into a pair of fluid retentive chambers 240, 250 disposed on opposite surfaces of the filter 260. As shown in the FIG. 2 embodiment, the filter 260 is sheet-like and is mounted such that the filter 260 is substantially parallel to the rotation axis X of the rotor assembly 21. Opposing ends of the filter 260 are held in mounting supports 261, 262 such that chambers 240 and 250 are sealably separated from each other except for fluid or other materials which may travel between the chambers 240, 250 via permeation through the filter 260.

The description as follows assumes for explanation purposes that the apparatus is being used to separate or concentrate a biomass of cells suspended in an aqueous medium.

As shown in FIG. 2, a fluid feed groove 270 is provided in the top plate 200 for inputting the cell-containing broth into the chamber 250 at an inlet port position 271 which is closely adjacent to the surface 272 of the filter. An outlet groove 280 is also provided in plate 200 for allowing fluid which is being continuously input to continuously exit the chamber 250 thus maintaining a continuous flow of fluid into and out of chamber 250. The positioning of the inlet port 271 adjacent the surface 272 of the filter serves to create agitation on the filter surface 272 and thus deter cells from aggregating on surface 272. As can be readily imagined, the position and orientation of inlet port 271 can be arranged in any of a variety of ways so as to direct the input fluid flow along the filter surface 272.

As shown in FIGS. 1, 2 the fluid feed is fed via pump 189 from supply 181 through line 171,270 into chamber 250. The fluid feed 181 is typically pumped or otherwise input at such a rate so as to maintain the fluid flowing through chamber 250 at a pressure differential relative to the pressure in chamber 240 which is sufficient to allow fluid to permeate in the direction 275 through the filter 260 into chamber 240. The fluid permeating into chamber 240 is cell-free or cell-reduced and is continuously removed from the chamber 240 through groove 290 and line 173 via pumping or other conventional means.

As shown, as the rotor assembly 21 is rotated, centrifugal force acts on the suspended cells to cause the cells to travel in a radially outward direction 300. The combination of the continuous fluid flow into and out of chamber 250 and the centrifugal force thus serves to maintain the surface 272 of filter 260 and filter 260 generally free of cells adhering thereto or otherwise blocking the pores of the filter 260.

Figure 4:
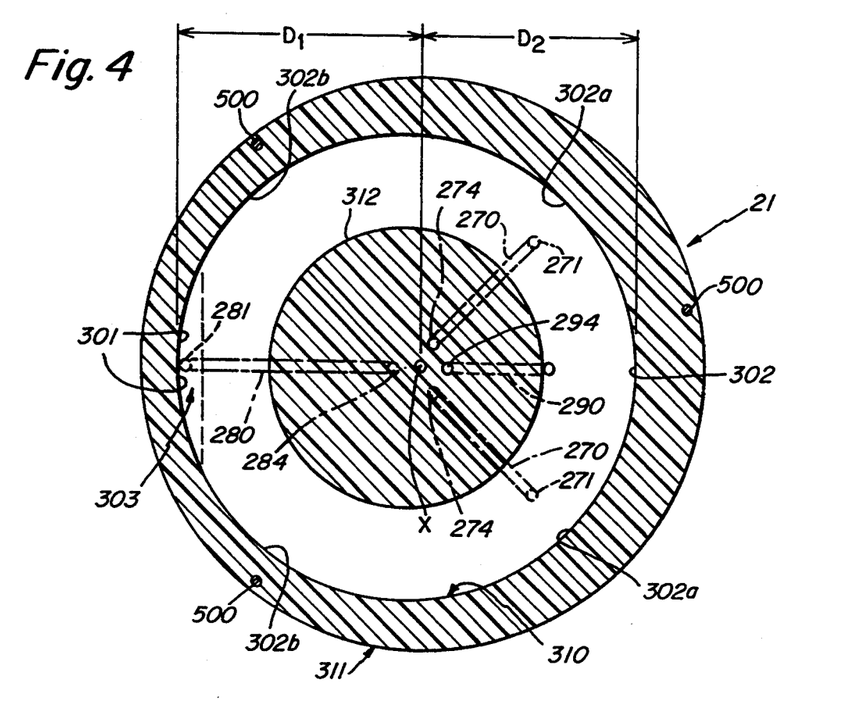
FIG. 4 is a top schematic sectional view of the FIGS. 2 and 3 rotors showing the arrangement of fluid inlet and outlet channels and inlet and outlet ports of the channels relative to the inlet and output chambers of the rotors.

As shown in FIGS. 2, 4 the radially outward distance $D_1$ from the axis X to the radially outermost portion 301 of the outer wall surface 310, FIG. 4 of input chamber 250 is greater than the radially outward distance $D_2$ to most of the remainder 302, 302a, 302b of the outer wall surface 310 of chamber 250. In the FIGS. 2–5 embodiments the outer wall surface 310 of chamber 250 is circular in cross-section and arranged somewhat eccentric to the axis X and, when the rotor assembly 21 is rotated, all cells travelling radially outwardly 300 will tend to ultimately aggregate toward the most radially outward portion 301 of the outer wall surface 310. Such an eccentric or asymmetrically configured outer wall surface 310, FIG. 4, serves to concentrate the cells in a relatively small space 303 within chamber 250 such that the cells can be more easily removed in a concentrated form.

As shown in FIGS. 2, 3 the port 281 to outlet line 280, 172 is disposed in the immediate vicinity of the most radially outward wall section 301 and the port 281 communicates with the most radially outwardly disposed portion 303 of the volume of chamber 250. Thus, as all of the outwardly travelling 300 cells tend to aggregate toward wall section 301 the cells tend to concentrate within the relatively small volume portion 303 rather than be evenly distributed around the entirety of the outer wall surface 310. By disposing outlet portion 281 in the immediate vicinity of volume portion 303, the outflow 283 received through port 281 is guaranteed of being highly concentrated in cells and can then be routed through line 280, 172 into storage receptacle 182.

As shown in FIGS. 2, 3, 4 the channel ports 274,284, 294 are all generally closely disposed around the central rotation axis X such that the terminal ends of tubes 171, 172, 173 can be sealably connected to each port 274,284,294 as a tubing bundle 170 having its axis substantially coincident with the rotation axis X at the point of attachment to rotor plate 200.

FIG. 3 shows another exemplary embodiment of the FIG. 2 filtration rotor assembly 21 wherein the filter 260 is mounted such that the filter 260 is disposed perpendicular to the rotation axis X. Items labelled with the same reference numerals in FIG. 3 have the same function as described above with reference to FIG. 2 and the FIG. 3 rotor assembly 21 operates in the same manner as the FIG. 2 apparatus operates. As shown in FIG. 3, the fluid suspended cell input chamber 250 extends from a radially inward wall 312 to a radially outward wall 310 which is eccentrically configured around the rotation axis X. The radially outward chamber wall 310 has a portion or section 301 which is further outwardly extending than most of the remainder 302, 302a, 302b of the outer wall 310, and a small portion 303 of the volume of chamber 250 is thus created toward which all of the outwardly travelling 300 cells will aggregate under the centrifugal force. As in the FIG. 2 device, cell containing fluid is fed into chamber 250 of the FIG. 3 apparatus under a pressure sufficient to allow fluid to permeate 275 through the filter 260. As shown in FIG. 3, input port 271 is arranged so as to direct a flow of fluid at and along the filter surface 272 and the fluid is continuously removed through outlet port 281 thus serving to prevent cells from adhering to surface 272.

In the FIG. 3 embodiment, the cells are travelling 300 along the surface 272 rather than directly away from surface 272 as in the FIG. 2 embodiment. In either case, however, the cells move away from the filter surface under the centrifugal force.

Figure 5:
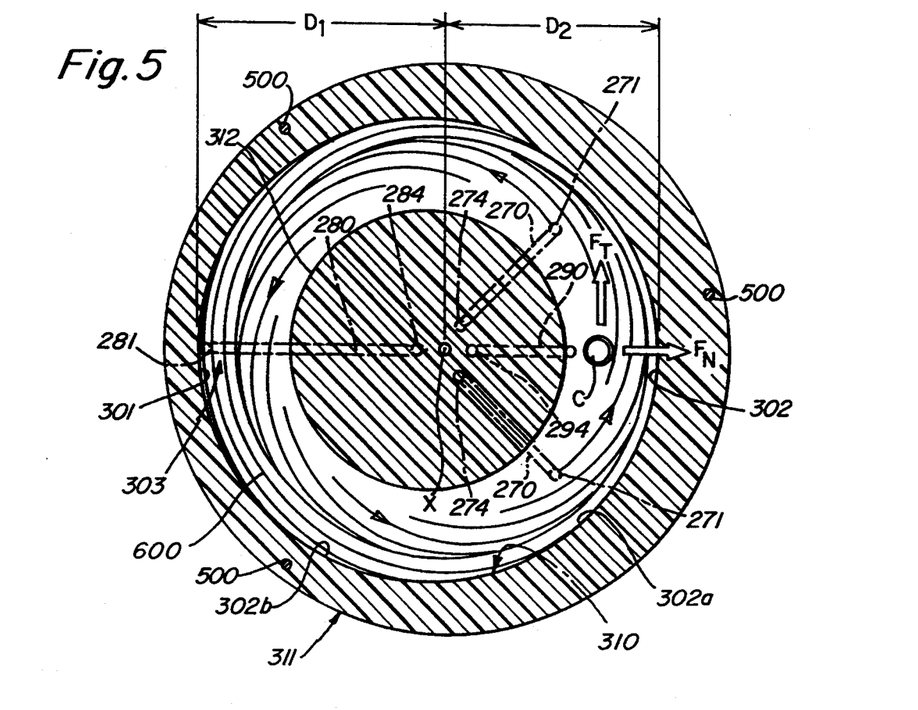
FIG. 5 is a top schematic sectional view of the FIGS. 2 and 3 rotors showing exemplary sedimentation path lines for the solid material component of a solids containing fluid which is input into the input chamber of the FIGS. 2, 3 rotors.
Figure 6B:
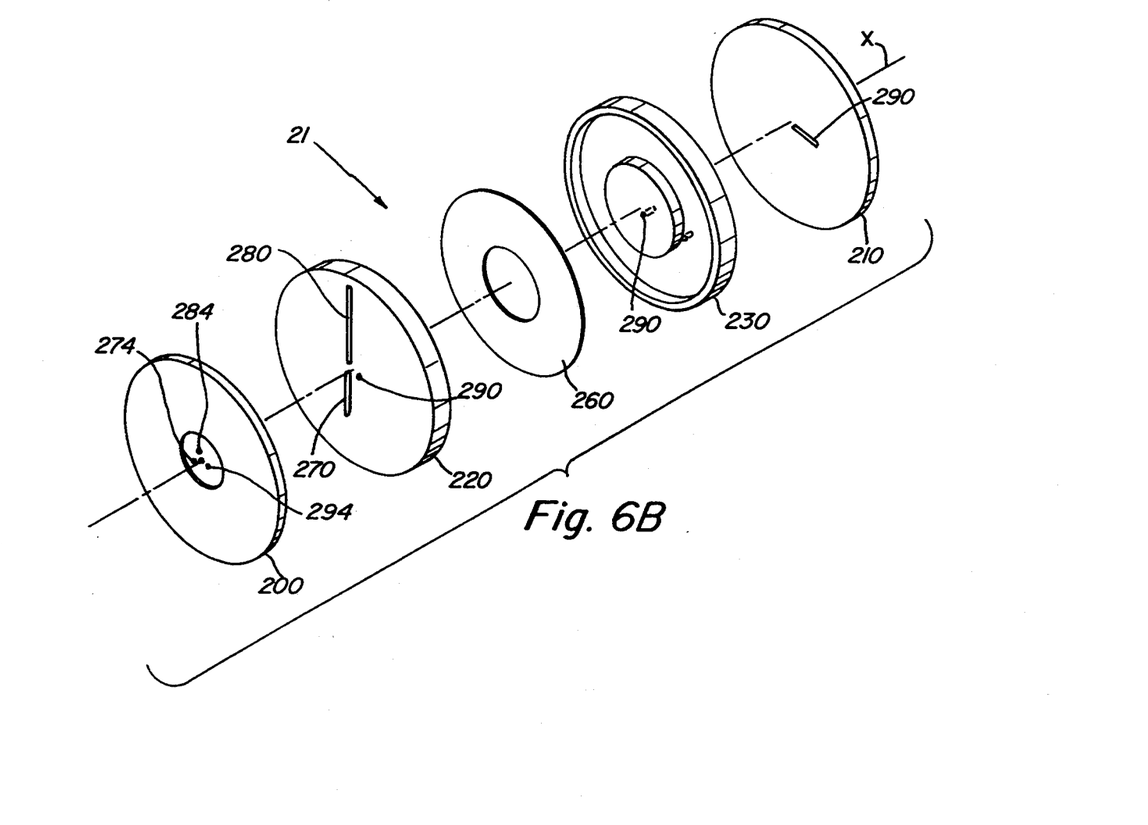
FIG. 6B is a exploded view of the rotor component FIG. 6A assembly.

FIG. 6B shows the FIG. 3 rotor assembly 21 in exploded view for illustration purposes. As shown in FIG. 6B, the rotor assembly 21 comprises the plates 200,210 and intermediate sections 220, 230 which can be manufactured inexpensively for example by injection molding from a suitable polymeric or plastic material and assembled in a simple fashion as illustrated in FIG. 6B. In practice, if the various components 200-230 can be manufactured and assembled inexpensively enough, the rotor assembly 21 can be cost effectively used as a disposable device. FIGS. 4, 5 show exemplary aperture locations 500 where bolts can be inserted so as to longitudinally extend through and connect components 200-230 together.

FIG. 4 shows a top schematic view of the FIGS. 2 and 3 rotors 21 better showing the eccentricity of the radially outward wall 310 and the radially outermost portion 303 of the volume of chamber 250 to which the outwardly travelling cells will tend to concentrate. A pair of cell containing fluid inlet channels 270 are shown in FIG. 4 for illustration purposes and both channels operate in the manner described above with reference to FIGS. 2, 3.

FIG. 5 is a view similar to the top view of FIG. 4 and similarly labelled items have the same function as described with reference to FIGS. 2-4. FIG. 5 shows schematically sedimentation path lines 600 which suspended cells would take within chamber 250 when a FIG. 2 or 3 apparatus is rotated at an appropriate speed. As shown in FIG. 5, due to the eccentricity or asymmetry of outer wall 310 relative to axis X cells will tend to ultimately migrate toward the outermost portion 303 of the volume of chamber 250. FIG. 5 illustrates this effect by the cell path lines 600 being most concentrated toward the volume 303, less concentrated at a less radially distant wall position 302b, even less concentrated at an even less radially distant wall position 302a and least concentrated at the least radially distant outer wall position 302. As shown in FIG. 5, the cells tend to travel radially outwardly in a spiral path due to the combination of centripetal force $F_n$ resulting from rotational drive of the rotor and a tangential force $F_t$ resulting from viscous drag acting on a suspended cell C. The resultant force on a cell C is equal to $F_n + F_t$ and tends to move a cell or other solid material in a radially outward spiral direction as schematically shown in FIG. 5.

In an alternative embodiment of the invention, the outer radial wall 310 of the suspended solids input chamber 250 may be symmetrically arranged around the axis X, rather than eccentrically or asymmetrically, e.g., in the form of a circular or cylindrical wall 310 having a center or axis which is coincident with the rotation axis X. In such an embodiment, the outwardly travelling 300 solid particles will tend to aggregate or concentrate in an even layer around the entire circumference of the wall 310. In such an embodiment, the outlet port 281 is preferably disposed at a radial position which is not immediately adjacent the vicinity of the outer wall surface 310, e.g., at position 315, FIGS. 2, 3, where solid material is not tending to aggregate or concentrate under centripetal force. In such an embodiment, the solid material is not removed in concentrated form during rotation. Rather, the solid material is simply allowed to continue to aggregate along the outer wall surface 310, and the user simply stops the rotation of the cassette 21 at an appropriate time when the chamber 250 has become fully loaded with concentrated solid matter. The cassette itself is thus in essence used as the ultimate collection and storage receptacle 182 and may be disassembled later for recapture of the concentrated solid material or the solids can be resuspended in a suitable solution and pumped or gravity drained from the rotor. Such an embodiment is particularly useful where the cassette is a disposable item intended for one-time or limited use. As can be readily imagined, a cassette having an eccentrically or asymmetrically arranged outer wall 310 may also be used for the same purpose if the outlet port 281 is appropriately disposed at a sufficiently radially inward position such as position 315, FIGS. 2, 3.

The method and apparatus of the invention further contemplates selectively controlling the velocity of fluid flow through chamber 250 versus the rotational speed $2\omega$ of the rotor 20, 21 so as to selectively control the distance or rate of sedimentation of one or more solid materials which may be suspended in the fluid. Such a process is particularly useful in separating two or more different solid materials which may be suspended in the same fluid where the different solid materials have different particle densities. In such a process, two or more suspended solid materials can be separated from each other and simultaneously concentrated or separated from the fluid and, the fluid is simultaneously filtered through filter 260 so as to be totally or partially free of solid materials.

Figure 8:
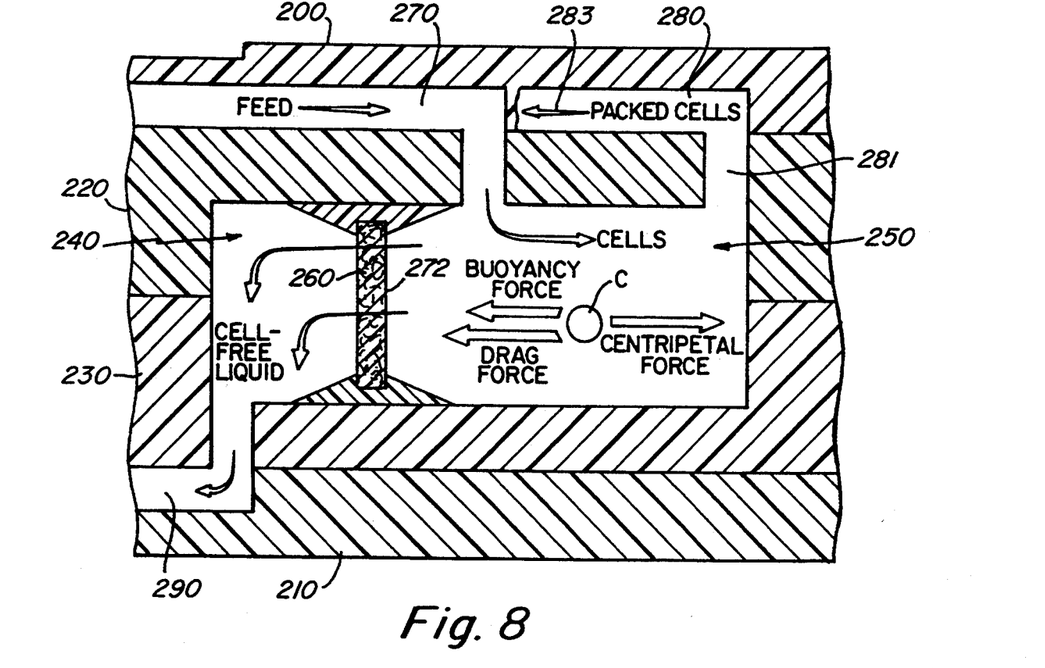
FIG. 8 is a side cross-sectional view of a portion of a filtration rotor having a vertically disposed membrane filter.
Figure 9:
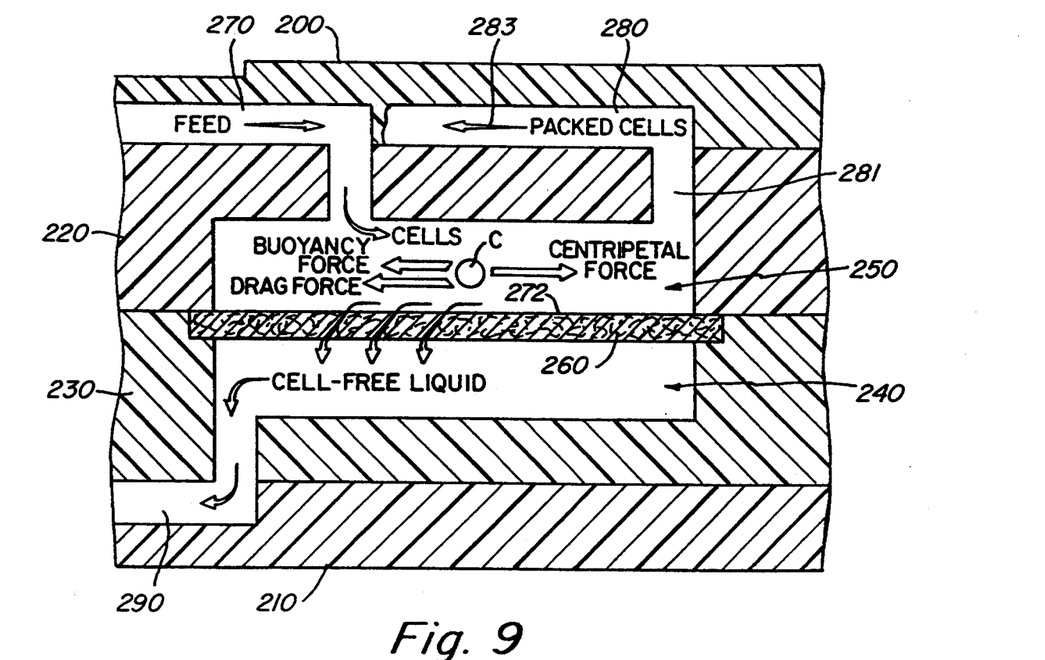
FIG. 9 is a side cross-sectional view of a portion of a filtration rotor having a horizontally disposed membrane filter.

With reference to FIGS. 8, 9, the centripetal force, $F_c$, acting on a given particle such as a cell C, may be calculated from and is a function of the rotational speed of the rotor, the density of the particle C, the volume of the particle and the radial distance from the mass center of the particle C to the rotational axis X. The drag force, $F_d$ on the particle C may be calculated from and is dependent on the viscosity of the fluid, the radius of the particle C and the velocity of the particle relative to the fluid. The buoyancy force, $F_b$ on the particle may be calculated from and is dependent on the density of the fluid and the particle C, the volume of the particle, the radial distance from the mass center of the particle to the rotation axis X and the rotational speed of the rotor.

The rate of sedimentation, i.e. the net of $F_C + F_D + F_B$ can thus be controlled for a given fluid of known density and solid particulate material of known density and volume by varying the two readily controllable factors, the velocity of fluid flow through chamber 250 and the rotational speed of the rotor. Thus if the surface 272 of the filter starts to clog, either the velocity of the feed can be reduced which reduces drag force, or the rotor speed can be increased which increases centripetal force, or both, which will increase the sedimentation rate which tends to unclog the surface 272 of filter 260. As can be readily imagined, when $F_c + F_d + F_b = 0$ the particle is in equilibrium, i.e. it has no radial movement.

Where two or more solid materials having different particle densities are present, the two materials can be controllably separated as mentioned above. For example, where a biomass obtained from a bioreactor contains healthy, dense cells together with less dense, dead cells or other debris, the feed velocity and rotor speed can be controlled so as to allow the lighter debris to aggregate at the surface 272 of the filter 260, a fluid exit port can be located at about the radius of the filter surface 272 and the lighter debris continuously removed while the healthy denser cells are simultaneously centrifuged toward the radially outward wall 310 of the rotor. The continuous removal of the lighter debris maintains the sedimentation layer around the filter surface 272 thin while the continuous flow of fluid tangentially along surface 272 tends to dislodge the less dense debris and thus prevent blinding.

Alternatively, where two materials of different densities are to be separated within chamber 250, the more dense material which sediments more quickly toward the outer radial wall 310 can be continuously removed through an appropriately positioned outlet port and the less dense material allowed to aggregate at an equilibrium position radially inward from the outlet port.

Thus, by controlling the rotor speed and the fluid feed (or throughput) rate, the sedimentation rate of any two or more particle materials of different densities suspended in the fluid medium can be controlled.

Figure 10:
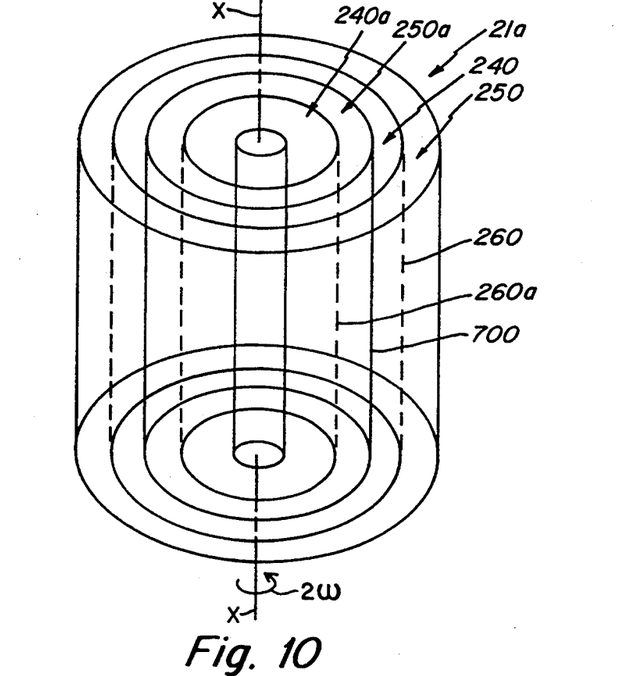
FIG. 10 is a schematic view of a generic embodiment configuration of a rotor according to the invention.

FIG. 10 schematically shows an embodiment of the invention where two pair of concentric input/output chambers 240/250 and 240a/250a are arranged within a single rotor 21a. The pairs of chambers are concentrically separated by a solid wall 700. As can be readily imagined, the two pair of chambers can serve to increase the capacity of the rotor 21a by providing a greater filter area 260,260a as opposed to the use of a single filter and a single pair of chambers.

Figure 11:
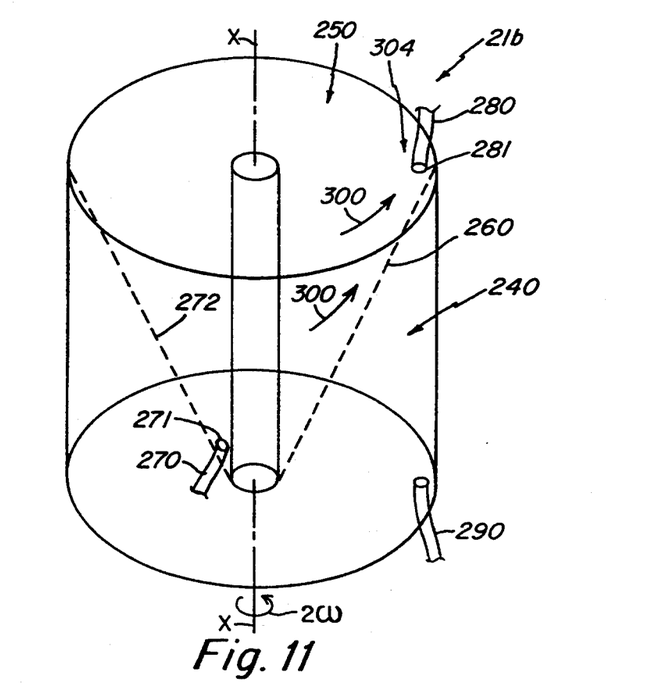
FIG. 11 is a schematic view of another generic embodiment configuration of a rotor according to the invention.

FIG. 11 shows schematically an embodiment of the invention where the filter 260 is disposed at about a 45 degree angle to the rotation axis X of a rotor 21b. As shown, the input chamber 250 is disposed on the radially inward surface of the filter 260 and the outlet port 281 communicates with the chamber 250 at a point which is about the most radially outwardly distant volume 304 within chamber 250 to which the suspended solid material travels 300 under the influence of centripetal force. The feed inlet port 271 is arranged so as create an inlet flow tangentially along the surface 272 of the filter 260.

As demonstrated by FIG. 11, specific shape, form and disposition of the filter 260 relative to the axis X may be selected and arranged in any of a variety ways as long as the input chamber 250 has a relatively confined outer radially disposed space 304 to which the outwardly travelling solid material can migrate 300 and aggregate without blinding a substantial portion of the surface area 272 of the filter 260.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A rotary filtration apparatus for separating a selected material suspended in a fluid, the apparatus comprising:
    a housing having a selected axis of rotation, the housing being rotatably mounted on a rotation device which rotates the housing about the selected axis of rotation of the housing;
    the housing sealably enclosing and defining a fluid sealed cavity extending radially outwardly from the axis of the housing;
    a filter mounted within the cavity of the housing such that the cavity is divided into at least a first fluid retentive input chamber and a second fluid retentive output chamber, the input and output chambers being disposed on opposite sides of the filter;
    a fluid input line sealably communicating with the fluid input chamber for feeding the material suspended in the fluid into the input chamber under a selected pressure;
    the filter being selectively permeable to the fluid under the selected pressure and selectively impermeable to the selected material under the selected pressure, the fluid being fed into the input chamber flowing through the filter and into the output chamber under the selected pressure;
    a fluid output line sealably communicating with the input chamber for receiving and routing fluid which is fed into the input chamber out of the input-chamber;
    the rotation device drivably rotating the housing around the axis such that the material suspended in the fluid in the input chamber is forced to travel under centrifugal force in a radially outward direction from the axis.

2. The apparatus of claim 1 wherein the output line communicates with the input chamber at a radially outward position from the axis within the input chamber toward which the material in the fluid is forced to travel under the centrifugal force.

3. The apparatus of claim 1, wherein the output line communicates with the input chamber at a position which is the most radially distant position from the axis within the input chamber.

4. The apparatus of claim 1 wherein the filter comprises a sheet, the sheet being disposed within the housing such that the sheet is substantially perpendicular to the axis of rotation.

5. The apparatus of claim 1 wherein the housing is mounted on the rotation device such that the rotation axis is substantially horizontal relative to ground.

6. The apparatus of claim 5 wherein the filter comprises a sheet, the sheet being disposed within the housing such that the sheet is substantially perpendicular to the axis of rotation.

7. The apparatus of claim 1 wherein the output line has an inlet port communicating with the selected portion of the volume of the input chamber which is further radially distant from the axis of rotation than the remainder of the volume of the input chamber.

8. A rotary filtration apparatus for separating a selected material suspended in a fluid, the apparatus comprising:
    a housing having a selected axis of rotation, the housing being rotatably mounted on a rotation device which rotates the housing about the selected axis of rotation of the housing;
    the housing sealably enclosing and defining a fluid sealed cavity extending radially outwardly from the axis of the housing;
    a filter mounted within the cavity of the housing such that the cavity is divided into at least a first fluid retentive input chamber and a second fluid retentive output chamber, the input and output chambers being disposed on opposite sides of the filter;
    a fluid input line sealably communicating with the fluid input chamber for feeding the material suspended in the fluid into the input chamber under a selected pressure;
    the filter being selectively permeable to the fluid under the selected pressure and selectively impermeable to the selected material under the selected pressure, the fluid being fed into the input chamber flowing through the filter and into the output chamber under the selected pressure;
    a fluid output line sealably communicating with the input chamber for receiving and routing fluid which is fed into the input chamber out of the input chamber;
    the rotation device drivably rotating the housing around the axis such that the material suspended in the fluid in the input chamber is forced to travel under centrifugal force in a radially outward direction from the axis, wherein the input chamber has a selected volume, a selected portion of the volume of the chamber extending further radially distant from the axis of rotation than the remaining volume of the chamber.

9. The apparatus of claim 8 wherein the output line has an inlet port communicating with the selected portion of the volume of the input chamber which is further radially distant from the axis of rotation than the remainder of the volume of the input chamber.

10. A rotary filtration apparatus for separating a selected material suspended in a fluid, the apparatus comprising:
    a housing having a selected axis of rotation, the housing being rotatably mounted on a rotation device which rotates the housing about the selected axis of rotation of the housing;
    the housing sealably enclosing and defining a fluid sealed cavity extending radially outwardly from the axis of the housing;
    a filter mounted within the cavity of the housing such that the cavity is divided into at least a first fluid retentive input chamber and a second fluid retentive output chamber, the input and output chambers being disposed on opposite sides of the filter;

a fluid input line sealably communicating with the fluid input chamber for feeding the material suspended in the fluid into the input chamber under a selected pressure;

the filter being selectively permeable to the fluid under the selected pressure and selectively impermeable to the selected material under the selected pressure, the fluid being fed into the input chamber flowing through the filter and into the output chamber under the selected pressure;

a fluid output line sealably communicating with the input chamber for receiving and routing fluid which is fed into the input chamber out of the input chamber;

the rotation device drivably rotating the housing around the axis such that the material suspended in the fluid in the input chamber is forced to travel under centrifugal force in a radially outward direction from the axis, wherein the filter comprises a sheet having two opposing surfaces, one surface facing radially inwardly toward the rotation axis and another surface facing radially outwardly away from the rotating axis.

11. The apparatus of claim 10 wherein the input chamber is disposed around the radially outwardly facing surface of the filter.

12. The apparatus of claim 10 wherein the filter is disposed within the housing such that the sheet is substantially parallel to the axis of rotation.

13. The apparatus of claim 10 wherein the input chamber has a selected volume, a selected portion of the volume of the chamber being further radially distant from the axis of rotation than the remaining volume of the chamber.

14. The apparatus of claim 13 wherein the output line has an inlet port communicating with the selected portion of the volume of the input chamber which is further radially distant from the axis of rotation than the remainder of the volume of the input chamber.

15. A rotary filtration apparatus for separating a selected material suspended in a fluid, the apparatus comprising:

a housing having a selected axis of rotation, the housing being rotatably mounted on a rotation device which rotates the housing about the selected axis of rotation of the housing;

the housing sealably enclosing and defining a fluid sealed cavity extending radially outwardly from the axis of the housing;

a filter mounted within the cavity of the housing such that the cavity is divided into at least a first fluid retentive input chamber and a second fluid retentive output chamber, the input and output chambers being disposed on opposite sides of the filter;

a fluid input line sealably communicating with the fluid input chamber for feeding the material suspended in the fluid into the input chamber under a selected pressure;

the filter being selectively permeable to the fluid under the selected pressure and selectively impermeable to the selected material under the selected pressure, the fluid being fed into the input chamber flowing through the filter and into the output chamber under the selected pressure;

a fluid output line sealably communicating with the input chamber for receiving and routing fluid which is fed into the input chamber out of the input chamber;

the rotation device drivably rotating the housing around the axis such that the material suspended in the fluid in the input chamber is forced to travel under centrifugal force in a radially outward direction from the axis, wherein the filter comprises a sheet, the sheet being disposed within the housing such that the sheet is substantially perpendicular to the axis of rotation; and, wherein the input chamber has a selected volume, a selected portion of the volume of the chamber being further radially distant from the axis of rotation than the remaining volume of the chamber.

16. The apparatus of claim 15 wherein the output line has an inlet port communicating with the selected portion of the volume of the input chamber which is further radially distant from the axis of rotation than the remainder of the volume of the input chamber.

17. A rotary filtration apparatus for separating a selected material suspended in a fluid, the apparatus comprising:

a housing having a selected axis of rotation, the housing being rotatably mounted on a rotation device which rotates the housing about the selected axis of rotation of the housing;

the housing sealably enclosing and defining a fluid sealed cavity extending radially outwardly from the axis of the housing;

a filter mounted within the cavity of the housing such that the cavity is divided into at least a first fluid retentive input chamber and a second fluid retentive output chamber, the input and output chambers being disposed on opposite sides of the filter;

a fluid input line sealably communicating with the fluid input chamber for feeding the material suspended in the fluid into the input chamber under a selected pressure;

the filter being selectively permeable to the fluid under the selected pressure and selectively impermeable to the selected material under the selected pressure, the fluid being fed into the input chamber flowing through the filter and into the output chamber under the selected pressure;

a fluid output line sealably communicating with the input chamber for receiving and routing fluid which is fed into the input chamber out of the input chamber;

the rotation device drivably rotating the housing around the axis such that the material suspended in the fluid in the input chamber is forced to travel under centrifugal force in a radially outward direction from the axis, wherein the housing is mounted on the rotation device such that the rotation axis is substantially horizontal relative to the ground; and, wherein the filter comprises a sheet having two opposing surfaces, one surface facing radially inwardly toward the rotation axis and another surface facing radially outwardly away from the rotating axis.

18. The apparatus of claim 17 wherein the input chamber is disposed around the outwardly facing surface of the filter.

19. The apparatus of claim 18 wherein the input chamber has a selected volume, a selected portion of the volume of the chamber being further radially distant from the axis of rotation than the remaining volume of the chamber.

20. A rotary filtration apparatus for separating a selected material suspended in a fluid, the apparatus comprising:

a housing having a selected axis of rotation, the housing being rotatably mounted on a rotation device which rotates the housing about the selected axis of rotation of the housing;

the housing sealably enclosing and defining a fluid sealed cavity extending radially outwardly from the axis of the housing;

a filter mounted within the cavity of the housing such that the cavity is divided into at least a first fluid retentive input chamber and a second fluid retentive output chamber, the input and output chambers being disposed on opposite sides of the filter;

a fluid input line sealably communicating with the fluid input chamber for feeding the material suspended in the fluid into the input chamber under a selected pressure;

the filter being selectively permeable to the fluid under the selected pressure and selectively impermeable to the selected material under the selected pressure, the fluid being fed into the input chamber flowing through the filter and into the output chamber under the selected pressure;

a fluid output line sealably communicating with the input chamber for receiving and routing fluid which is fed into the input chamber out of the input chamber;

the rotation device drivably rotating the housing around the axis such that the material suspended in the fluid in the input chamber is forced to travel under centrifugal force in a radially outward direction from the axis, wherein the housing is mounted on the rotation device such that the rotation axis is substantially horizontal relative to the ground; wherein the filter comprises a sheet, the sheet being disposed within the housing such that the sheet is substantially perpendicular to the axis of rotation; and, wherein the input chamber has a selected volume, a selected portion of the volume of the chamber being further radially distant from the axis of rotation than the remaining volume of the chamber.

21. The apparatus of claim 20 wherein the output line has an inlet port communicating with the selected portion of the volume of the input chamber which is further radially distant from the axis of rotation than the remainder of the volume of the input chamber.

22. A rotary filtration apparatus for separating a selected material suspended in a fluid, the apparatus comprising:

a housing having a selected axis, the housing being rotatably mounted on a rotation device which rotates the housing about the selected axis;

the housing sealably enclosing and defining a fluid sealed cavity;

a filter having two opposing surfaces mounted within the cavity of the housing such that the cavity is divided into at a first fluid retentive chamber and a second fluid retentive chamber disposed on opposite sides of the filter wherein each of the opposing surfaces of the filter faces one of the chambers and wherein one of the chambers contains a fluid having a selected material suspended therein;

the filter being permeable to the fluid and impermeable to the selected material suspended in the fluid contained in the one chamber;

the rotation device rotating the housing around the selected axis such that the selected material suspended in the fluid in the one chamber is forced to travel in a direction radially outwardly from the selected axis of rotation by centrifugal force;

the one of the opposing surfaces of the filter facing the one chamber containing the fluid which contains the selected suspended material being continuously cleaned from contact with the selected material by the radially outward travel of the selected material under the centrifugal force.

23. The apparatus of claim 22 further comprising a fluid removal port communicating with the one chamber at a selected position within the one chamber toward which the selected material travels radially outwardly from the axis under the centrifugal force.

24. The apparatus of claim 22 further comprising a fluid input port communicating with the one chamber at a first position, wherein fluid containing the selected material is continuously input into the one chamber during rotation of the housing and wherein the continuously input fluid is continuously removed form the one chamber through a fluid removal port communicating with the one chamber at a second selected position within the one chamber.

25. The apparatus of claim 22 further comprising a fluid input port communicating with the one chamber at a position and being arranged such that fluid input through the input port travels in a direction across the surface of the filter facing the one chamber containing the fluid which contains the selected suspended material.

26. The apparatus of claim 25 further comprising multiple fluid output ports communicating with the one chamber containing the selected suspended material at selected positions and multiple fluid input ports communicating with the one chamber at selected other positions.

27. The apparatus of claim 22 further comprising a fluid output port communicating with the one chamber containing the suspended material at a selected position, the fluid contained within the other chamber continuously flowing into the second chamber through the filter during rotation of the housing, the fluid continuously flowing into the one chamber being continuously removed from the one chamber through the fluid output port.

28. The apparatus of claim 27 further comprising multiple fluid output ports communicating with the one chamber containing the selected suspended material cheer at selected positions.

* * * * *